United States Patent [19]

Weyant

[11] 4,441,409
[45] Apr. 10, 1984

[54] APPARATUS FOR BLANCHING PEANUTS

[75] Inventor: Lowell E. Weyant, Edenton, N.C.

[73] Assignee: Seabrook Blanching Corporation, Albany, Ga.

[21] Appl. No.: 419,818

[22] Filed: Sep. 20, 1982

[51] Int. Cl.³ .............................................. B02B 3/00
[52] U.S. Cl. ...................................... 99/523; 99/579; 99/609; 99/623; 99/628
[58] Field of Search ................................. 99/518–524, 99/568, 528, 579–583, 600, 609, 610, 623–625, 628

[56] References Cited

U.S. PATENT DOCUMENTS 1,292,297  1/1919  Friedrich .............................. 99/523

Primary Examiner—Timothy F. Simone
Attorney, Agent, or Firm—Morse, Altman & Dacey

[57] ABSTRACT

Apparatus for use in blanching edible nuts, particularly peanuts. Two generally vertical plates are disposed in spaced parallel relation to one another and connected to a drive mechanism for producing lengthwise oscillations of the two plates, both of which are covered with abrasive inner surfaces. Unblanched peanuts are fed into a gap at the top of the two plates, which are set apart by a distance generally corresponding to the average thickness of the peanuts being processed. As the peanuts move down between the plates, the oscillating action of the plates blanches the peanuts which drop out through the bottom and are carried away for further processing, packaging, inspection or the like. Vertical grooves are formed in the inner face of each plate near each end thereof to prevent the nuts from falling out of the open ends between the plates. Adjustment means are provided for changing the size of the gap between plates and for tilting the plates away from one another to form changes in the shape of the gap between the plates.

4 Claims, 8 Drawing Figures

APPARATUS FOR BLANCHING PEANUTS

BACKGROUND OF THE INVENTION

1. Field of the Invention

The present invention relates generally to equipment used to blanch nuts, and more particularly is directed towards a simple, adjustable apparatus for blanching peanuts that are difficult to blanch with conventional equipment.

2. The Prior Art

For a great many peanut products, it is common practice in the peanut industry to blanch the peanuts at some stage in their preparation as an end product. The blanching step involves the removal of the thin dark skin from shelled nuts and, typically, this may be done by a variety of different techniques and equipment. An early process involved water blanching in which the nuts were soaked in hot water to loosen the skins, then the nuts were fed along a horizontal belt under oscillating pads which rubbed the skins from the nuts. More recently nuts have been dry blanched.

Usually dry blanching is a three step operation starting with the slitting of the nut skins by passing nuts between a pair of resiliently mounted blades. The nuts are then heated to cause the skin to peel slightly back from the slit portion and, finally, the nuts are transferred onto a moving belt which carries the nuts against fixed abrasive baffles extending above and diagonally across the surface of the moving belt. The abrasive baffles in combination with the moving belt fully remove the dark skin from the nuts. The above prior art is exemplified by the following U.S. Pat. Nos. 2,605,797, 2,699,806 and 3,196,914.

While the foregoing equipment has proven to be very satisfactory in blanching most types of nuts on a mass production basis, it has been found that some types of nuts are more difficult to blanch than others, possibly because of the particular shape of the nut or the tightness of the skin on the nut. In either event, equipment heretofore available has not proven to be satisfactory for blanching efficiently those type of nuts that are considered in the trade to be difficult to blanch.

SUMMARY OF THE INVENTION

It is a principal object of the present invention to provide a new and improved apparatus for blanching peanuts of all kinds on a continuous basis.

More specifically, it is an object of the present invention to provide an apparatus for blanching peanuts comprising a pair of generally coextensive spaced parallel plates disposed in generally vertical planes and in spaced opposition to one another. The opposing faces of the plates are of an abrasive character and generally are spaced apart by a distance corresponding to the average thickness of peanuts dropped into the top of the gap therebetween. Drive means are connected to the plates for oscillating the plates lengthwise and out of phase to one another, whereby nuts passing therebetween will be blanched. Vertical grooves are formed near the outer edges of each abrasive face in order to contain nuts within the gap as they move from the top to the bottom thereof. Adjustment means also are provided for moving one plate to and away from the other plate in order to vary the gap therebetween and, both the plates are angularly adjustable for tilting one or both with respect to the vertical plane.

Other objects of the present invention will in part be obvious and will in part appear hereinafter.

The invention accordingly comprises the apparatus of the present disclosure, its components, parts and their interrelationships, the scope of which will be indicated in the appended claims.

BRIEF DESCRIPTION OF THE DRAWINGS

For a fuller understanding of the nature and objects of the present invention, reference is to be made to the following described description, which is to be taken in connection with the accompanying drawings, wherein.

DETAILED DESCRIPTION OF THE PREFERRED EMBODIMENT

Figure 1:
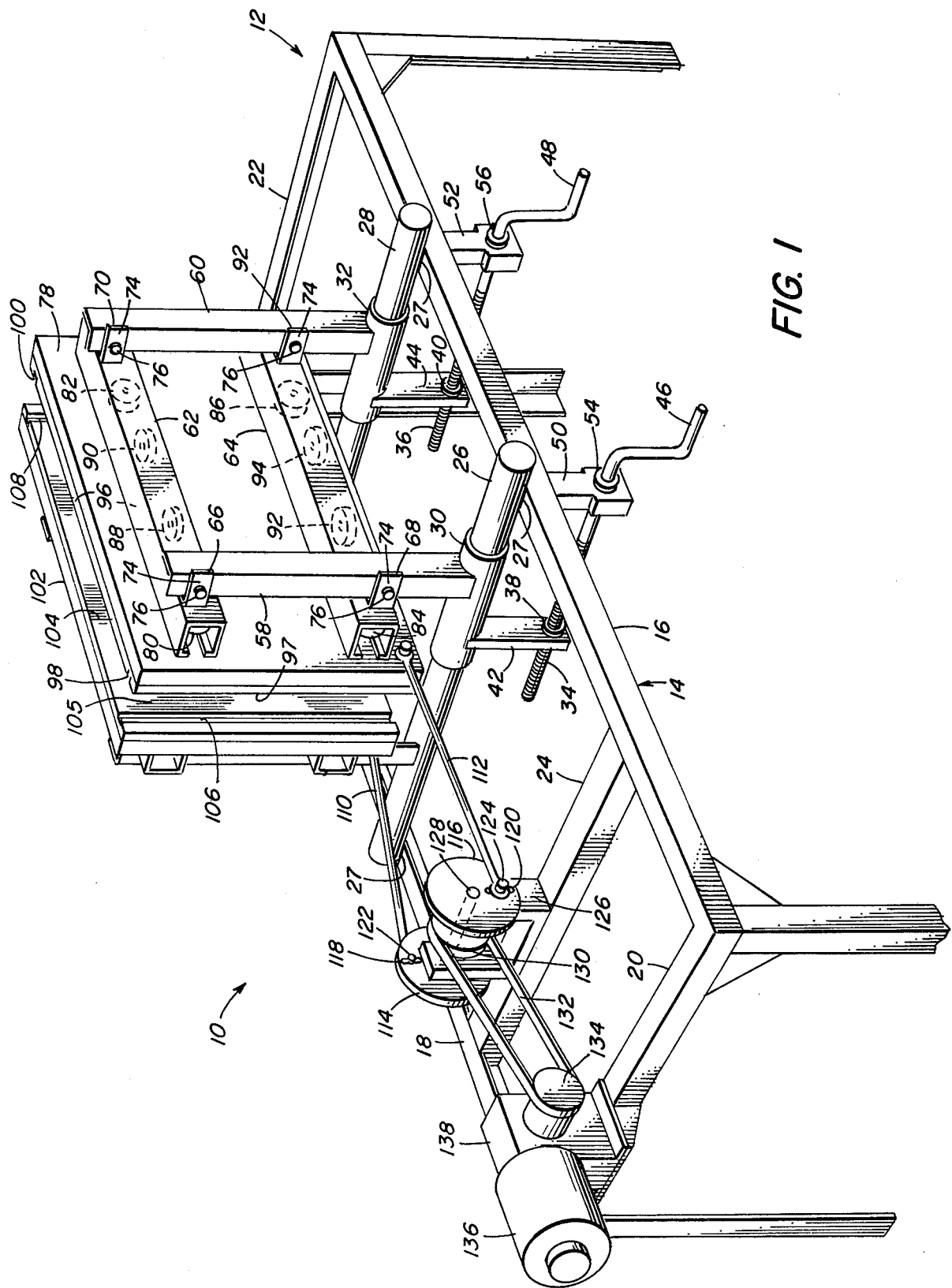
FIG. 1 is a view in perspective of a nut blanching apparatus made according to the invention.
Figure 2:
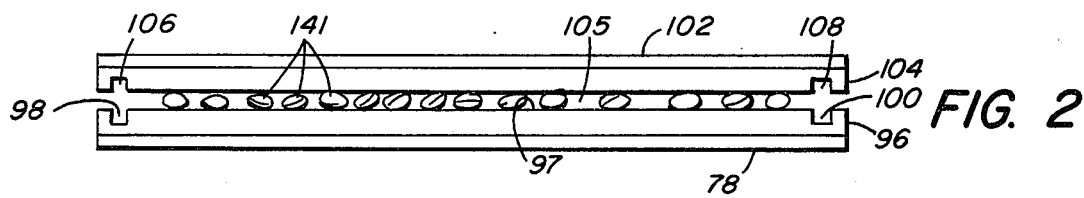
FIG. 2 is a top plan view of the spaced blanching plates employed in the apparatus.

Referring now to the drawings, the reference character 10 generally indicates an apparatus for blanching edible nuts, especially peanuts, the apparatus 10 being generally organized about a framework 12.

The framework 12 may take various forms. In the illustrated embodiment, it includes an open rectangular horizontal upper frame 14 comprised of parallel side rails 16 and 18 and transverse end rails 20 and 22. An additional cross frame member 24 is provided near the left hand end of the apparatus 10, and a pair of spaced, parallel, tubular guideways 26 and 28 are mounted towards the right hand end of the frame 14 and respectively secured thereto on the top of the side rails 16 and 18, as for example by being welded thereto as at 27. All framework members preferably are fabricated from structural steel or other suitable material capable of withstanding the stresses resulting from the operation of the apparatus 10.

Each of the tubular guideways 26 and 28 carries a sleeve 30,32 respectively, with each sleeve 30, 32 having a slightly greater inside diameter than the outside diameter of the tubular guideways 26 and 28 to allow the sleeves to move smoothly along the guideways. Movement of the sleeves 30 and 32 is effected by means of lead screws 34, 36 connected through a follower 38, 40 carried on the lower end of brackets 42, 44 fixed to the sleeve 30 and 32. Lead screws 34 and 36 are turned by crank handles 46 and 48 disposed at the outer end of each of the lead screws 34 and 36. The outer end of the lead screws 34 and 36 are supported by members 50 and 52 depending from the side rail 16 and each having suitable bearings 54 and 56. Other means may likewise be provided for adjusting the position of the sleeves 30 and 32 on the guideways 26 and 28 such, for example, as a rack and pinion mechanism or the like.

Fixed to and extending vertically upright from each of the sleeves 30 and 32 is a rigid bracket 58, 60 of angle iron or the like to which are mounted a pair of horizontal vertically spaced channel members 62 and 64. The members 62 and 64 are attached to the brackets 58 and 60 by tabs 66, 68, 70 and 72. Each tab 66, 68, 70 and 72 is formed with a horizontal slot 74, to receive a bolt 76 threaded to the brackets 58 and 60 respectively. The slot arrangement allows for adjustment in the apparatus 10 as will be described more fully below.

Figure 4:
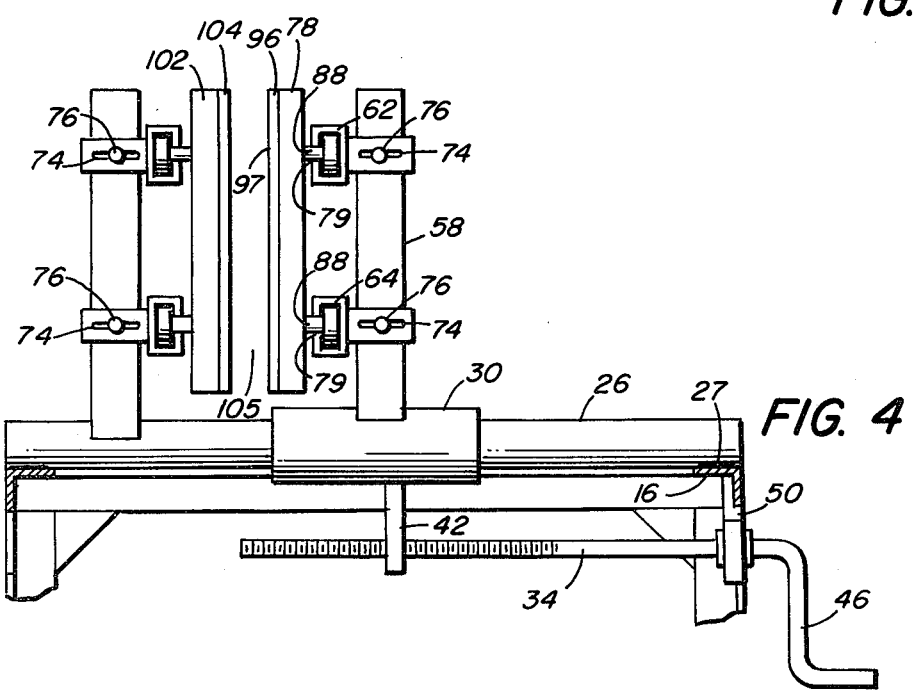
FIG. 4 is a view in end elevation showing the plate support and adjustment mechanism; and, FIGS. 5A, 5B, 5C and 5D are end elevations showing the blanching plates in different operating positions.

When the apparatus 10 is adjusted and in operation, the upright brackets 58 and 60 remain fixed in position as do the channel members 62 and 64. The channel members 62 and 64 provide sliding support for a rectangular plate 78 of a rigid material such as steel, aluminum, or the like. The plate 78 is mounted to the channel members 62 and 64 by means of a pair of rollers 80 and 82 for the upper channel member 62 and a second a second pair of rollers 84 and 86 to the lower channel member 64. These rollers 80, 82, 84 and 86 rotate about horizontal axes and connect to the plate 78 by means of axles 88 (see FIG. 4). The axles 88 extend through a slot 79 formed by each of the channel members 62 and 64, which are C-shaped in cross section. The rollers 80, 82, 84 and 86 ride against the inside walls of the respective channel members 62 and 64 to slidably support the plate 78 in the vertical plane.

In order to provide lengthwise control of the plate 78 and to ensure that the position of the plate 78, once set, does not shift or wobble during operation, another set of rollers 88, 90 are mounted to the upper channel member 62 and further rollers 90 and 92 are mounted to the lower channel member 64. Rollers 88, 90, 92 and 94 rotate about vertical axes which are mounted to their respective channel members 62 and 64. The edges of the rollers 88, 90, 92 and 94 extend through the slot opening 79 of the channel members 62 and 64 and bear against the plate 78. Thus, when the plate 78 is horizontally and lengthwise oscillated back and forth with respect to the fixed channels 62 and 64, its movement will be smooth and steady. While the plate 78 can be made in a variety of sizes and shapes, a rectangular shape is preferred, and dimensions of 18 inches in height and 4 feet in length have been found satisfactory.

Mounted to the inner face of the plate 78 is a stratum 96 which is of a hard but somewhat flexible material, preferably a firm rubber or other similar composition. The stratum 96 is coextensive with the plate 78 and its outer face 97 is textured in a grid pattern, for example, to give an abrasive quality to the stratum 96 for use in blanching peanuts. Other patterns may be used, and the surface 97, in the alternative, can be coated with an abrasive grit.

At each end of the stratum 96, there is a vertical groove 98 and 100 extending the full height of the stratum 96 and of the plate 78. The function of the grooves 98 and 100 is to contain the peanuts between the plate 78 and a plate 102. The plate 102 is in all respect of a construction similar to that of plate 78 with the exception that it is mounted in a fixed, albeit tiltable position onto the guideways 26 and 28, since it is necessary to move only one of the plates to or away from the other in order to adjust a gap 105 therebetween. Otherwise, the plate 102 includes the same roller support system as that of the plate 78, with the plate 102 being covered by a stratum 104 formed with grooves 106 and 108. The face of the stratum 104 is also textured to give it an abrasive character.

The two plates 78 and 102 are designed to oscillate lengthwise back and forth but out of phase with one another. Various means may be employed to provide the oscillating movement.

In the illustrated embodiment, this oscillating movement is provided by means of a pair of tie rods 110, 112 drivingly connected at their right hand ends to their respective plates 102 and 78 and, at their left hand ends, eccentrically connected to a pair of drive wheels 114 and 116. The connection between the tie rods 110, 112 and the plates 102 and 78 as well as the drive wheels 114 and 116 is sufficiently loose to allow for the tilting of the plates 102 and 78 and for the gap adjustment between the plates 78 and 102. Each of the drive wheels 114 and 116 is formed with radial slots 118 and 120. One end of the tie rods 100 and 112 is respectively connected to the slots 118 and 120 by means of bolts 122, 124. The bolts 122 and 124 pass through eyes formed in the ends of the tie rods 100 and 112 also through their respective slots 118 and 120 to engage respective nuts. The bolts 122 and 124 may be loosened to move the ends of the respective tie rod 110 or 112 closer to or farther away from the center of the respective drive wheels 114 and 116 in order to decrease or increase the length of the lengthwise stroke of the plates 78 and 102.

The drive wheels 114 and 116 are rotatably supported by a U-shaped bracket 126 which carries a drive shaft 128. Between the arms of the bracket 126 and mounted to the drive shaft 128, is a pulley 130 engaging a belt 132 which also engages a pulley 134. The pulley 134 is driven by means of a motor 136 through a gear box 138.

Figures 5A, 5B, 5C, 5D:
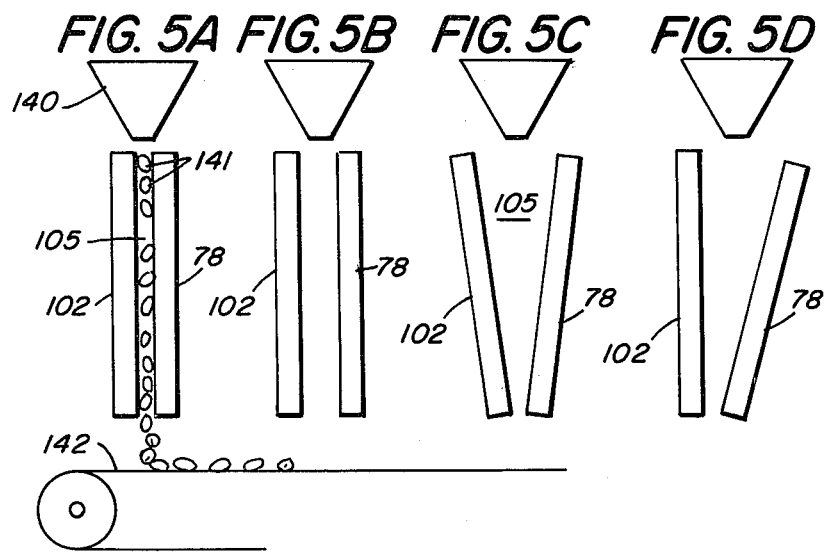
Figure 3:
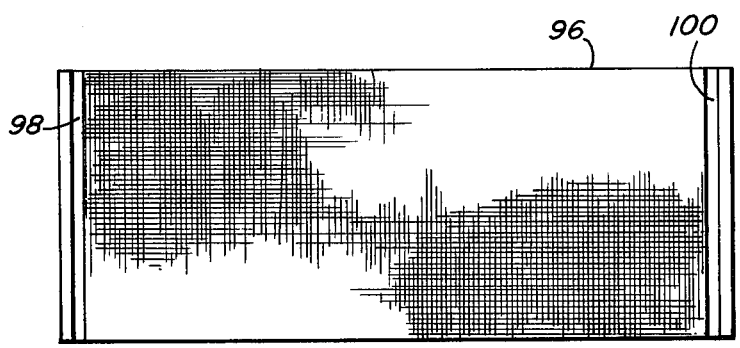
FIG. 3 is a front elevation of one of the blanching plates employed in the apparatus.

In operation and as best shown in FIG. 5A, peanuts 141 are fed from a hopper 140 into the top of the gap 105 between the two plates 78 and 102, which gap 105 has been pre-set to correspond with the particular size of the nuts 141 being blanched. The nuts 141 move down between the abrasive strata 96 and 104, which together with the plates 78 and 102 are oscillating horizontally lengthwise but 180° out of phase to each other. This motion, together with the abrasive character of the plates 102 and 78 rubs off the dark outer skin of the peanuts 141 so that by the time the peanuts 141 drop out of the bottom of the gap 105, they are fully blanched and travel on to a conveyor 142 for further processing such as roasting or the like or may be packaged for shipping.

The function of the grooves 98, 100, 106 and 108, formed in the strata 96 and 104, respectively, is to contain the peanuts 141 and prevent them from falling out the ends of the gap rather than moving down through between the abrasive surfaces 96 and 104. It has been found that the peanuts 141 moving out towards the ends of the gap will be caught by the grooves 98, 100, 106 and 108 and will move downwardly to fall out through the bottom of the gap 105. Thus, even though the plates 78 and 102 are oscillating very rapidly and have no closures at the ends of the plates, substantially all of the peanuts 141 will be contained within the gap 105 and will be blanched before dropping out through the bottom of the gap 105 onto the conveyor 142.

In FIGS. 5B, 5C and 5D, there are shown slightly exaggerated several possible positions of the plates 78 and 102 to meet different blanching requirements. For example in FIG. 5B, the plates 78 and 102 have been spaced further apart than the plates 78 and 102 in FIG. 5A to accommodate larger size peanuts. In FIG. 5C, both plates 78 and 102 have been tilted so that the upper part of the gap 105 is wider than the lower part. Again, the angles are somewhat exaggerated for illustrative purposes. Adjustment of the angle is by means of the slots 74. By loosening the bolts 76, the plates 78 and/or 102 can be adjusted, within a certain range, to the desired angle. In some instances it may be desirable to adjust both plates 78 and 102 to positions as shown in FIG. 5C or, one plate 102 may be vertical while the other 78 is tilted, as in FIG. 5D.

In practice, a number of blanching apparatus 10 will be arranged in a row, with the upper reach of the conveyor 142 coming under all of them to collect their respective output.

While the invention has been described with particular reference to the illustrated embodiment, numerous modifications thereto will appear to those skilled in the art without departing from the scope of the invention.

Having thus described the invention, what I claim and desire to obtain by Letters Patent of the United States is:

1. Apparatus for blanching edible shelled nuts, comprising:
   (a) a pair of members mounted in spaced opposed parallel relation to one another to define a gap therebetween, said gap being adjustable to the average thickness of said nuts;
   (b) each of said members formed with a generally flat vertical face, both of said faces being generally coextensive with one another and in opposite facing relation to one another;
   (c) both of said faces being of an abrasive character,
   (d) means for mounting said pair of members for oscillating lengthwise movement along parallel paths and out of phase with one another;
   (e) drive means operatively connected to said pair of members for oscillating said members in parallel whereby nuts delivered into the upper end of said gap will be blanched as said nuts move downwardly through said gap for discharge from the lower end of said gap; and
   (f) stroke adjustment means connected to said mounting means and said drive means for selectively adjusting said oscillating lengthwise parallel movement of said pair of members;
   (g) each of said flat vertical faces formed with a vertical groove along the marginal vertical edges thereof.

2. Apparatus according to claim 1 including angle adjustment means operatively connected to said mounting means for selectively tilting one of said, pair of members with respect to the vertical plane of said faces.

3. Apparatus according to claim 1 wherein said mounting means includes a pair of C-shaped horizontal channel members, and a pair of upright brackets supporting said pair of C-shaped horizontal channel members, a first pair of rollers mounted to each of said pair of members for rotation about parallel horizontal axes and within said pair of C-shaped horizontal channel members, and a second pair of rollers mounted to said pair of C-shaped horizontal channel members for rotation about parallel vertical axes and riding against said pair of members.

4. Apparatus according to claim 1 including a pair of horizontal parallel guideways, a slide member movable along each of said guideways, one of said pair of members being mounted to said slide member to permit one of said pair of members to be moved to or away from the other of said pair of members, so as to adjust thereby said gap therebetween.

* * * * *